(12) United States Patent
Olsmo

(10) Patent No.: US 12,479,303 B2
(45) Date of Patent: Nov. 25, 2025

(54) SAFETY CIRCUIT FOR AN ELECTRICAL TRACTION SYSTEM AND METHOD FOR CONTROLLING THE SYSTEM

(71) Applicant: Volvo Penta Corporation, Gothenburg (SE)

(72) Inventor: Emil Olsmo, Torslanda (SE)

(73) Assignee: Volvo Penta Corporation, Gothenburg (SE)

( * ) Notice: Subject to any disclaimer, the term of this patent is extended or adjusted under 35 U.S.C. 154(b) by 245 days.

(21) Appl. No.: 18/104,400

(22) Filed: Feb. 1, 2023

(65) Prior Publication Data
US 2023/0278430 A1 Sep. 7, 2023

(30) Foreign Application Priority Data
Mar. 1, 2022 (EP) ..................................... 22159373

(51) Int. Cl.
*B60L 3/04* (2006.01)
*B63B 79/40* (2020.01)
(52) U.S. Cl.
CPC ............ *B60L 3/04* (2013.01); *B60L 2200/32* (2013.01); *B63B 79/40* (2020.01)
(58) Field of Classification Search
CPC ........ B60L 3/04; B60L 3/0092; B60L 3/0046; Y02T 10/70
See application file for complete search history.

(56) References Cited

U.S. PATENT DOCUMENTS

| | | | | |
|---|---|---|---|---|
| 11,056,806 B2* | 7/2021 | Etsunagi | ............... | H01M 10/44 |
| 2009/0051226 A1* | 2/2009 | Marukawa | ............ | B60L 3/0069 |
| | | | | 307/328 |
| 2013/0328512 A1* | 12/2013 | Ozaki | .................. | H02H 7/0805 |
| | | | | 361/31 |
| 2014/0035359 A1* | 2/2014 | Graf | ...................... | B60R 16/033 |
| | | | | 307/9.1 |
| 2014/0159908 A1* | 6/2014 | Hong | ..................... | G01R 31/52 |
| | | | | 702/58 |

(Continued)

FOREIGN PATENT DOCUMENTS

| | | |
|---|---|---|
| CN | 107901763 A | 4/2018 |
| CN | 207875401 U | 9/2018 |

(Continued)

OTHER PUBLICATIONS

Extended European Search Report for European Patent Application No. 22159373.4, mailed Aug. 16, 2022, 8 pages.

*Primary Examiner* — Anil K Bhargava
(74) *Attorney, Agent, or Firm* — Withrow & Terranova, PLLC

(57) ABSTRACT

A safety circuit for a high-voltage electrical traction system comprising a plurality of electric machines. The safety circuit comprises a primary high voltage interlock loop (HVIL) circuit configured to be connected to a battery and for each of the plurality of electric machines, a secondary high voltage interlock loop (HVIL) circuit, wherein each secondary HVIL-circuit is controlled by a corresponding switch unit configured to break the secondary HVIL-circuit if a fault in a corresponding electric machine is detected, and wherein the switch unit comprises a trigger device configured to break the primary HVIL-circuit if the switch unit is opened.

14 Claims, 2 Drawing Sheets

(56) References Cited

U.S. PATENT DOCUMENTS

| | | | |
|---|---|---|---|
| 2016/0200196 A1* | 7/2016 | Michaelides | B60L 50/16 |
| | | | 701/22 |
| 2017/0292982 A1 | 10/2017 | Acena et al. | |
| 2020/0052509 A1* | 2/2020 | Fan | H01R 31/08 |
| 2022/0024318 A1 | 1/2022 | Baumann et al. | |

FOREIGN PATENT DOCUMENTS

| | | |
|---|---|---|
| CN | 111376725 A | 7/2020 |
| CN | 112606692 A | 4/2021 |
| FR | 3108875 A1 | 10/2021 |

* cited by examiner

SAFETY CIRCUIT FOR AN ELECTRICAL TRACTION SYSTEM AND METHOD FOR CONTROLLING THE SYSTEM

RELATED APPLICATIONS

The present application claims priority to European Patent Application No. 22159373.4, filed on Mar. 1, 2022, and entitled "SAFETY CIRCUIT FOR AN ELECTRICAL TRACTION SYSTEM AND METHOD FOR CONTROLLING THE SYSTEM," which is incorporated herein by reference in its entirety.

TECHNICAL FIELD

The invention relates to a safety circuit for an electrical traction system comprising a plurality of electrical machines. In particular, the invention relates to a safety circuit comprising a primary and a secondary high voltage interlock loop (HVIL) circuit.

The invention can be applied in all types of vehicles having a fully or partially electrical propulsion system, such as trucks, buses, construction equipment and marine vessels. Although the invention will be described with respect to a marine vessel, the invention is not restricted to this particular vehicle.

BACKGROUND

In vehicles comprising electrical or hybrid drive systems, it is important to be able to safely disconnect the high-voltage energy source from the other high-voltage vehicle systems, for example for allowing the vehicle to be serviced and repaired in a secure manner. There are typically ways of manually shutting down or otherwise disconnecting the high-voltage system. However, due to the potentially great hazards of working with a high-voltage system that has not been properly shut down, back-up systems for ensuring that no high-voltage components are accessible to a user are desirable.

For this purpose, it is common to include a High-Voltage Interlock Loop (HVIL) circuit in a high-voltage system to de-energize the system when for instance a connector is opened. A HVIL-circuit may also be used to protect persons from arcing when opening a contactor carrying a DC-current. The high-voltage system also needs to be protected against overload and this is normally done by opening energy source contactors.

However, in some application it may not be desirable to shut off an entire power system due to a single fault in an electrical machine. A power system may for example comprise a large number of electrical machines where some may be critical for the functionality of the system and where it may be undesirable shut down the entire system in case of a fault in one of the electrical machines.

Thereby, there is a need for a safety circuit in a high-voltage power system comprising a plurality of electrical machines.

SUMMARY

An object of the invention is to provide an improved safety circuit for a high-voltage traction system comprising a plurality of electrical machines.

The object is achieved by a device/method according to claim 1.

Claim 1 describes a safety circuit for a high-voltage electrical traction system comprising a plurality of electric machines. The safety circuit comprises: a primary high voltage interlock loop, HVIL, circuit configured to be connected to a battery; and for each of the plurality of electric machines, a secondary high voltage interlock loop, HVIL, circuit, wherein each secondary HVIL-circuit is controlled by a corresponding switch unit configured to break the secondary HVIL-circuit if a fault in a corresponding electric machine is detected, and wherein the switch unit comprises a trigger device configured to break the primary HVIL-circuit if the switch unit is opened.

The present invention is based on the realization that it is desirable to be able to selectively disconnect electrical machines in a high-voltage system comprising a plurality of electric machines, and that this can be achieved by the described primary and secondary HVIL-circuits. The primary HVIL-circuit is connected to the battery and is thereby capable of breaking the connection to all of the electrical machines in case of a fault in the battery or in a connection to the battery. Meanwhile, the secondary HVIL-circuits control the connection to the respective electrical machines, where the circuitry of each electrical machine comprises such a secondary HVIL-circuit.

Moreover, each secondary HVIL-circuit is controlled by a switch unit and by physically opening the switch unit the primary HVIL-circuit is opened and it can thereby be ensured that no power is provided to the electrical machines, or that there is a high-voltage present in the switch unit when opened. The claimed system is particularly advantageous in power systems comprising a plurality of electrical machines such as in a marine application where it may be important to be able to repair and/or replace one electrical machine without shutting down the entire system. A ship comprising a power system with a plurality of electrical machines may for example rely on electrical machines for steering, in which case it is highly desirable to be able to operate functioning electrical machines at the same time as faulty electrical machines can be shut down.

According to a second aspect of the invention, the object is achieved by a method of controlling a safety circuit for a high-voltage electrical traction system comprising a plurality of electric machines. The circuit comprises: a primary high voltage interlock loop, HVIL, circuit configured to be connected to a battery; and for each of the plurality of electric machines, a secondary high voltage interlock loop, HVIL, circuit, wherein each secondary HVIL-circuit is controlled by a corresponding switch unit configured to break the secondary HVIL-circuit if a fault in an electric machine is detected, and wherein the switch unit comprises a trigger device configured to break the primary HVIL-circuit if the switch unit is opened, wherein the method comprises: by a power system control unit, controlling a contactor of a switch unit via a CAN-bus connecting the power system control unit to the switch unit.

Effects and features of this second aspect of the present invention are largely analogous to those described above in connection with the first aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

In the present detailed description, various embodiments of a high-voltage system according to the present invention are mainly discussed with reference to an electric traction system in a marine vessel. It should be noted that this by no means limits the scope of the present invention which is equally applicable to electric propulsion systems in other types of vehicles, and in particular in heavy vehicles.

Figure 1:
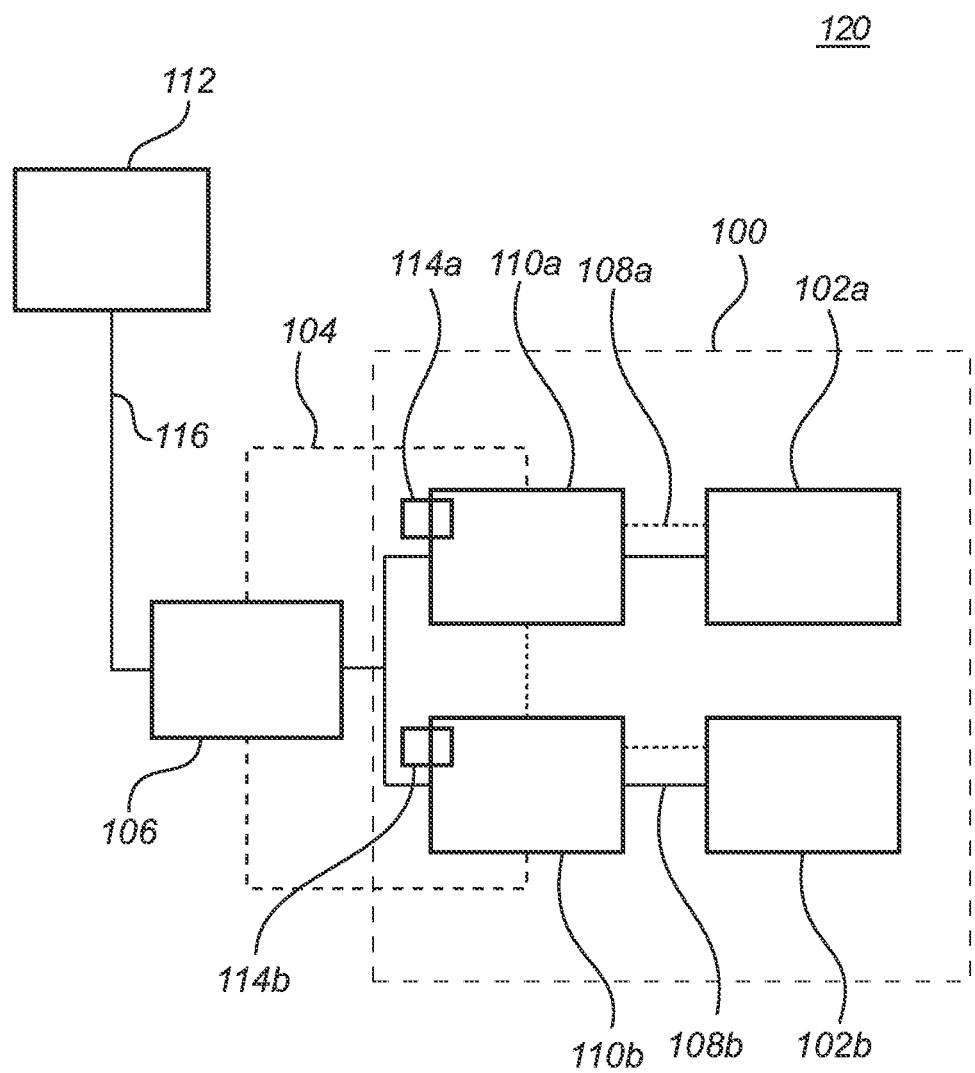
FIG. 1 is a block chart illustrating safety circuit for a high-voltage traction system according to an embodiment of the invention.

FIG. 1 schematically illustrates a block chart representing a safety circuit 100 for a high-voltage electrical traction system comprising a plurality of electric machines 102a-b and also a power system 120 comprising such a safety circuit 100. The electric machines 102a-b may for example be arranged to provide power to propellers in a marine vessel, thereby providing propulsion (i.e. traction) and/or steering of the vessel. However, the described invention may also be used in a traction system for a heavy vehicle comprising a plurality of electrical machines for vehicle propulsion.

A high-voltage system should in the present context be seen as a system comprising components operating at a voltage typically in the range of 400V-800V. The safety circuit 100 comprises a primary high voltage interlock loop, HVIL, circuit 104 configured to be connected to an electrical energy storage such as a battery 106. The primary HVIL-circuit 104 is configured to break a connection between the battery 106 and the traction system if a fault is detected in the battery or in another component connected to the primary HVIL-circuit 104.

The safety circuit 100 further comprises, for each of the plurality of electric machines 102a-b, a secondary high voltage interlock loop, HVIL, circuit 108a-b, wherein each secondary HVIL-circuit 108a-b is controlled by a corresponding switch unit 110a-b configured to break the secondary HVIL-circuit 108a-b if a fault in a corresponding electric machine 102a-b is detected. The switch unit 110a-b is a physical unit comprising the components required for detecting a fault in the circuit connecting the battery 106 to the electrical machine 102a-b and for breaking the circuit.

The switch unit 110a-b comprises a trigger device 114a-b configured to break the primary HVIL-circuit 104 if the switch unit 110a-b is physically opened, thereby ensuring that a user does not accidentally make contact with a live high-voltage component when opening the switch unit 110a-b. Moreover, the switch unit 110a-b may be a box comprising a lid, door, hatch or the like which can be manually opened, and the trigger device 114a-b is configured to detect opening of the door, lid or hatch. The trigger device 114a-b may for example be a mechanical relay or a sensor such as an optical or magnetic sensor connected to a contactor arranged to break the primary HVIL-circuit 104.

The described safety circuit 100 and power system 120 may also be implemented in a marine vessel comprising a serial hybrid propulsion system where one or more internal combustion engines are connected to one or more electrical machines in order to provide power to the battery 106 and/or for propulsion of the vessel.

Figure 2:
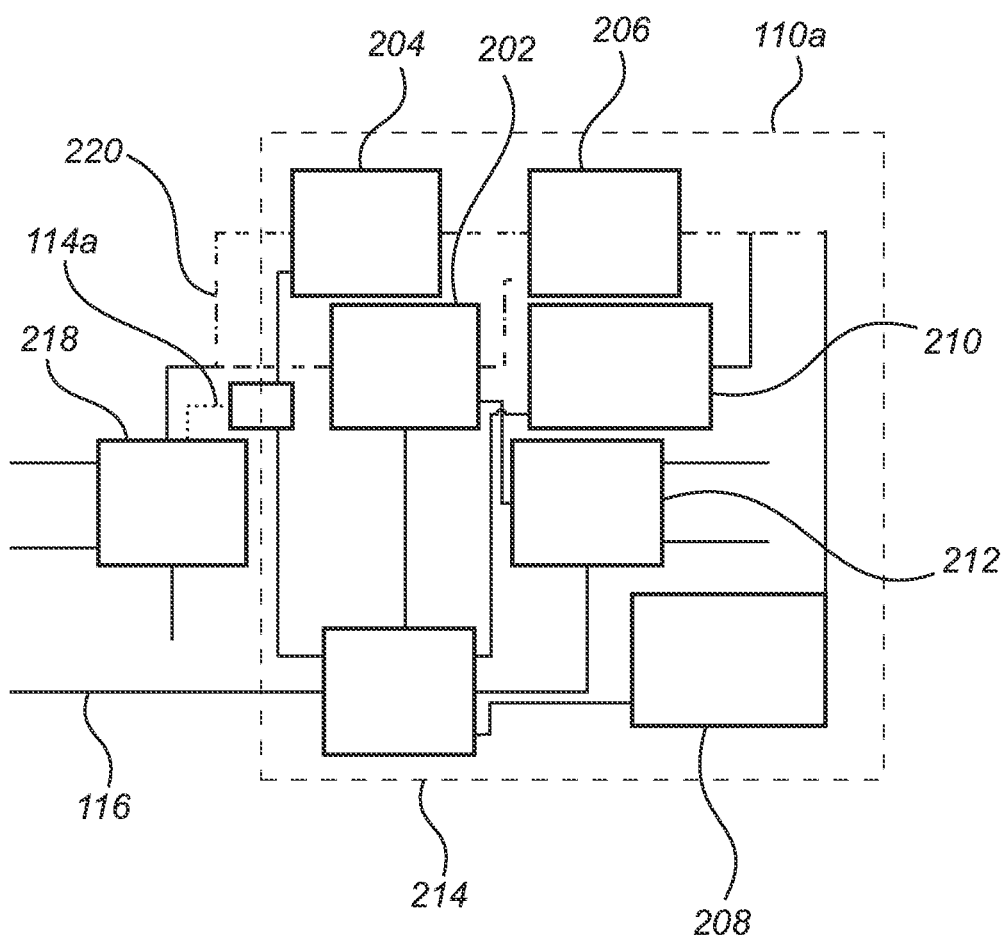
FIG. 2 is a block chart illustrating a switch unit of safety circuit for a high-voltage traction system according to an embodiment of the invention.

FIG. 2 schematically illustrates a block chart of a switch unit 110a. The switch unit comprises a contactor 202 and a contactor pre-charge device 204 connected to a CAN-bus 116 as part of the secondary HVIL-circuit 108a. The contactor 202 is arranged configured to break a connection between the battery 106 and the electrical machine 102a. The contactor pre-charge device 204 acts to pre-charge the power line prior to reconnection of an electrical machine to avoid e.g. arcing of the contactor and/or an inrush of current to the electrical machine. The switch unit further comprises a fuse 206 configured to break the connection between the battery 106 and the electrical machine 102a if a fault is detected in the electrical machine 102a or in the circuit connecting the battery 106 to the electrical machine 102a.

Furthermore, the switch unit 110a comprises a discharge circuit 208 configured to discharge energy from an electric machine after the switch has been opened. Due to capacitances in the electrical machine, there may be a remaining voltage over the electrical machine also after disconnecting the electrical machine from the battery. The discharge circuit 208 is configured to discharge the electrical machine to ensure that no voltage remains once the electrical machine is disconnected from the battery.

The switch unit 110a also comprises an isolation measurement unit 210 configured to determine a voltage between a respective positive and negative pole of the electrical machine and ground to further verify that no voltage is present over the electric machine, or that the voltage is below a predetermined threshold value. An isolation fault can for example be caused by damaged cables or by a fault in the electrical machine and associated circuitry. Thereby, the isolation measurement unit 210 verifies that the isolation is sufficiently good for safely connecting the electrical machine to the power supply.

A control unit 214 of the switch unit 110a is connected to a CAN-bus 116 and configured to control both the contactor 202, contactor pre-charge device 204, discharge circuit 208, isolation measurement unit 210 and to a control unit 212 of the secondary HVIL-circuit 108a.

The connection to the CAN-bus 116 thereby allows the switch unit 110a to be fully controlled remotely from a central location.

Moreover, FIG. 2 also illustrates the trigger device 114a of the switch unit 110a. The trigger device 114a is connected to a control unit 218 of the primary HVIL-circuit 104 so that the primary HVIL-circuit 104 can be opened if the trigger device 114a detects that the switch unit is physically opened.

An input power line 220 is connected to the switch unit 110a running through the contactor 202 and the fuse 206 so that the power to the electric machine can be interrupted by the contactor 202 or the fuse 206.

The object of the invention is also achieved by a method of controlling the above described safety circuit 100. The method comprises controlling a contactor 202 of the switch unit 110a-b via a CAN-bus 116 connecting a power system control unit 112 to the switch unit 110a-b. An advantage of being able to control the switch unit via a CAN-bus 116 is that selected electrical machines can be disconnected from the power source from a central control unit which may be desirable in a large power system comprising a number of electrical machines, as may be the case in a marine vessel.

It is to be understood that the present invention is not limited to the embodiments described above and illustrated in the drawings; rather, the skilled person will recognize that many changes and modifications may be made within the scope of the appended claims.

The invention claimed is:

1. A safety circuit for a high-voltage electrical traction system comprising a plurality of electric propulsion machines, the safety circuit comprising:
   a primary high voltage interlock loop (HVIL) circuit configured to be connected to a battery;
   a first secondary HVIL circuit for a respective first electric propulsion machine of the plurality of electric propulsion machines,
   a second secondary HVIL circuit for a respective second electric propulsion machine of the plurality of electric propulsion machines,
   a first switch unit configured to break the first secondary HVIL-circuit if a first fault in the first electric propulsion machine is detected such that the second secondary HVIL-circuit maintains a closed condition, the first switch unit comprising a first trigger device configured to break the primary HVIL-circuit if the first switch unit is physically opened,
   a second switch unit configured to break the secondary HVIL-circuit if a second fault in the second electric propulsion machine is detected such that the first secondary HVIL-circuit maintains a closed condition, the second switch unit comprising a second trigger device configured to break the primary HVIL-circuit if the second switch unit is physically opened.

2. The safety circuit of claim 1, wherein the first switch unit comprises a contactor and a contactor pre-charge device connected to a CAN-bus, the contactor being configured to break a connection between the battery and the first electric propulsion machine.

3. The safety circuit of claim 1, wherein the first switch unit comprises a fuse configured to break the connection between the battery and the first electric propulsion machine if the first fault is detected in the first electric propulsion machine.

4. The safety circuit of claim 1, wherein the first switch unit is a box comprising a lid, door, or hatch and wherein the first trigger device is configured to detect opening of the door, lid, or hatch.

5. The safety circuit of claim 1, wherein the first trigger device is a mechanical relay.

6. The safety circuit of claim 1, wherein the first trigger device is an optical sensor.

7. The safety circuit of claim 1, wherein the primary HVIL-circuit is configured to maintain a closed condition if a fault in the first electric propulsion machine is detected.

8. The safety circuit of claim 2, wherein the first switch unit comprises a discharge circuit configured to discharge energy from the first electric propulsion machine after disconnecting the first electric propulsion machine from the battery.

9. The safety circuit of claim 2, wherein the first switch unit comprises an isolation measurement unit configured to determine an isolation resistance between a respective positive and negative pole of the first electric propulsion machine and ground.

10. A power system for a vehicle comprising:
    a battery;
    a plurality of electric propulsion machines; and
    the safety circuit of claim 1.

11. A vehicle comprising the power system of claim 10.

12. A method of controlling a safety circuit for a high-voltage electrical traction system comprising a plurality of electric propulsion machines, the safety circuit comprising:
    a primary high voltage interlock loop (HVIL) circuit configured to be connected to a battery;
    a first secondary HVIL circuit for a respective first electric propulsion machine of the plurality of electric propulsion machines,
    a second secondary HVIL circuit for a respective second electric propulsion machine of the plurality of electric propulsion machines,
    a first switch unit configured to break the first secondary HVIL-circuit if a first fault in the first electric propulsion machine is detected such that the second secondary HVIL-circuit maintains a closed condition, the first switch unit comprising a first trigger device configured to break the primary HVIL-circuit if the first switch unit is physically opened,
    a second switch unit configured to break the secondary HVIL-circuit if a second fault in the second electric propulsion machine is detected such that the first secondary HVIL-circuit maintains a closed condition, the switch unit comprising a second trigger device configured to break the primary HVIL-circuit if the second switch unit is physically opened,
    wherein the method comprises:
      by a power system control unit, controlling a contactor of the first switch unit via a CAN-bus connecting the power system control unit to the first switch unit.

13. A non-transitory computer readable medium carrying a computer program comprising program code means for performing the method of claim 12 when the computer program is run on a computer.

14. A controller configured to perform the steps of the method of claim 12.

* * * * *